Feb. 22, 1938.                W. J. OLIVER                2,109,434
STEAK POUNDER
Filed March 31, 1937
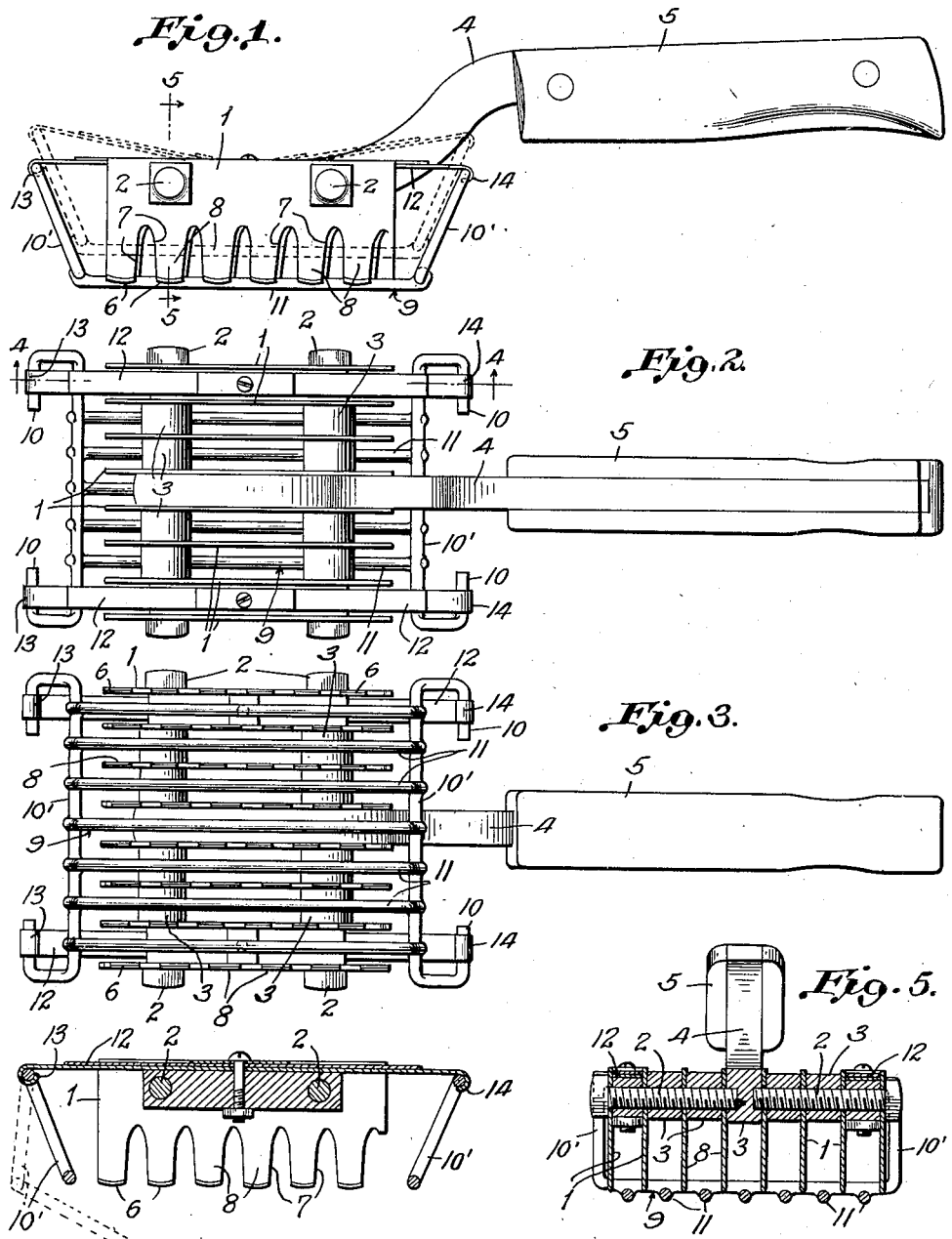
W. J. Oliver
INVENTOR
BY Victor J. Evans & Co.
ATTORNEYS Patented Feb. 22, 1938

2,109,434

UNITED STATES PATENT OFFICE 2,109,434

STEAK POUNDER

William J. Oliver, Los Angeles, Calif.

Application March 31, 1937, Serial No. 134,164

3 Claims. (Cl. 17—30)

This invention relates to a steak or meat pounder and has for the primary object the provision of a device of this character which will easily and rapidly sever the tissues of the meat to render said meat tender when cooked and which may be easily and quickly opened for cleaning.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating a meat pounder constructed in accordance with my invention.

Figure 2 is a top plan view illustrating the same.

Figure 3 is a bottom plan view illustrating the same.

Figure 4 is a sectional view taken on the line 4—4 of Figure 2.

Figure 5 is a transverse sectional view taken on the line 5—5 of Figure 1.

Referring in detail to the drawing, the numeral 1 indicates a plurality of relatively spaced parallel blades held in assembled position by bolts 2 which bolts extend through spacers 3 which are located between the blades except a pair of blades and positioned between the latter-named blades is a shank 4 in which the bolts 2 are threaded. The shank 4 extends beyond one end of the group of blades and is curved upwardly therefrom and terminates in a handle 5.

Each blade has a cutting edge 6 and extending inwardly from said cutting edge are slots 7 forming the cutting edge into a series of teeth-like portions 8.

A grating 9 is arranged to cooperate with the blades in severing the tissues of the meat and consists of end members 10' of substantially U-shape provided with hook-shaped portions 10 at the ends thereof. The U-shaped members are connected by relatively spaced bars 11 adapted to pass between the blades during the use of the device. Secured to certain of the spacers 3 are springs 12 which project beyond the ends of the groups of blades and each having one end terminating in an eye 13 and the other end terminating in a hook 14. The springs 12 are constructed of a series of leaves. The eyes 13 are applied to the hook-shaped portions 10 of one of the end members 10' thereby hingedly connecting the grating 9 to the groups of blades and the hooks 14 are adapted to snap into engagement with the hook-shaped portions 10 of the other end member 10'. The end members 10' of the grating 9 are positioned beyond the ends of the blades, as clearly shown in Figure 1. The grating is normally supported in a dotted line position, as shown in Figure 1, by the action of the springs. The springs 12 normally support the grating, as shown in full line position in Figure 1 but which will readily flex and permit the bars of the grating to move between the blades, as shown in dotted lines in Figure 1 during the use of the device.

In operation, a piece of meat is positioned on a block or similar support and is struck blows by this device. As the bars of the grating contact the meat they move upwardly between the blades while the cutting edges of the blades sever the tissues of the meat. When it is desired to clean the device, the grating is moved into dotted line position, as shown in Figure 4, allowing a person to get between the blades for removing foreign matter therefrom as well as between the bars of the grating.

What is claimed is:

1. A meat pounder comprising a group of blades arranged in parallel and spaced relation, a handle connected to said group of blades, a meat engaging grating movable relative to said blades and between the latter, and spring means connecting the grating to the groups of blades, said spring means hingedly connected with one end of the grating and detachably and hingedly connected to the other end of the grating.

2. A meat pounder comprising a group of blades arranged in spaced and parallel relation, a handle connected to the group of blades and positioned laterally thereof, a meat engaging grating including parallel spaced bars movable between the blades, and substantially U-shaped end members connecting said bars and terminating in hook-shaped portions, leaf-type springs secured to the group of blades and hingedly connected to the hook-shaped portions of one of the substantially hook-shaped end members of the grating and detachably connected to the hook-shaped portions of the other substantially U-shaped member of the grating.

3. A meat pounder comprising a shank, blades grouped at opposite sides of the shank and arranged in spaced relation and parallel to each other, bolts extending through said blades and threaded into the shank, spacers mounted on said bolts and arranged between certain of said blades, a handle formed on said shank, and a meat engaging grating resiliently connected to certain of said blades, said blades each including a cutting edge, and slots extending inwardly from the cutting edge.

WILLIAM J. OLIVER.